United States Patent Office 2,726,219
Patented Dec. 6, 1955

2,726,219

POLYALKYLENE ETHER GLYCOL-ARYLENE DI-ISOCYANATE ELASTOMER SPONGE AND PROCESS FOR PREPARING SAME

Frederick B. Hill, Jr., New Castle, Del., assignor to E. I. du Pont de Nemours and Company, Wilmington, Del., a corporation of Delaware No Drawing. Application August 24, 1951, Serial No. 243,575

4 Claims. (Cl. 260—2.5)

This invention relates to the preparation of new and valuable elastomeric sponge material and to a method for preparing the same from polyalkylene ether glycols and arylene diisocyanates.

In general, the manufacture of elastomeric sponge material from elastomers of various types is produced by expanding the elastomeric material in an uncured state with various types of so-called "blowing agents" and then effecting a curing or vulcanization of the elastomer in the blown condition. Two types of sponge materials are produced depending upon the processes involved, namely, those known as the continuous or open cell sponge, and the closed cell sponge. In the latter type the cells, or at least the majority of them, are closed, that is, not connected with one another, so that they are not water absorbent like the open or continuous cell sponge.

Usually the elastomeric sponge material is blown by the use of inorganic blowing agents such as sodium bicarbonate or by various organic blowing agents, although the introduction of inert gases such as nitrogen or carbon dioxide into the elastomers under high pressure has also been employed to expand vulcanizable elastomeric materials prior to vulcanization. In general, the open cell type sponge lacks structural strength and the quality of absorbing shock to a much greater degree than the closed cell types, and the purposes for which the two types are used are generally quite different. In the use of inorganic blowing agents the salts employed, which are electrolytes, are retained to some extent in the sponge material, and in the use of the organic blowing agents, which have found particular use in the production of closed cell sponge, the organic residues are likewise retained in the resulting products.

In my co-pending application Serial No. 237,660 filed July 19, 1951 (of which the present application is a continuation-in-part), now abandoned, a new type of elastomeric material is described which is produced by the reaction of high molecular weight polyalkylene ether glycols with arylene diisocyanates.

It is an object of the present invention to produce elastomeric sponge material from the new polyalkylene ether glycol-arylene diisocyanate reaction products by a process which requires no additional blowing agent. It is a further object of the invention to produce closed cell elastomeric sponge material which is resilient and tough and which can be cast or formed into articles of varying shape, and to produce articles having a closed cell structure which have a high degree of flame resistance and which are both freeze resistant and heat resistant, giving them utility over a wide range of temperatures.

I have found that, in the production of the elastomeric materials more particularly described in my co-pending application Serial No. 237,660, now abandoned, in which a polyalkylene ether glycol such as the polyethylene ether glycol and the polypropylene ether glycol, which has a molecular weight of from 750 to 6000, is reacted with an arylene diisocyanate and a somewhat larger amount of water is added in the completion of the reaction than that called for in the formation of the polymers themselves, closed cell sponge-like material can be produced, the expansion being due to the carbon dioxide generated in the final stages of the reaction. These sponge materials, which are of a substantially closed cell structure, are much softer than the rigid plastic foams that are usually produced from polystyrene, and have a high resistance to swelling by aliphatic hydrocarbons and are relatively insoluble in all of the common organic solvents. They are, however, swollen by certain of the aromatic solvents such as the aromatic hydrocarbons and chlorinated aromatic hydrocarbons. The final sponge material varies in color from white to pale yellow-brown, most of the types of polymers, as described in my co-pending application, resulting in a sponge which is cream colored. This sponge material is resilient, tough, and has high shock absorbent qualities.

In the preparation of the sponge material the reaction products of the polyalkylene ether glycol and the arylene diisocyanate of the types generally described in my co-pending application Serial No. 237,660, now abandoned, are produced by stirring the molten polyalkylene ether glycol and the arylene diisocyanate at about 75° C. until the reaction is substantially complete, as indicated by no further increase in viscosity, and then approximately 300 parts of water per 100 parts of the reaction mass are added, the water being at a temperature of from about 0° to 40° C. Under these conditions the carbon dioxide that is formed is trapped inside of the elastomer, forming the closed cell sponge structure. To avoid the formation of a tough, irregular surface the product should be dried at relatively low temperatures, that is, at ordinary room temperatures of from about 20° to 40° C. The rate of drying can be accelerated by reducing the pressure.

The procedure above outlined differs from that employed in the preparation of the elastomer itself in which only from 10 to 50 parts of water per 100 parts of reaction mass are employed and the reaction is carried out under milling conditions under which the carbon dioxide is liberated from the mass, with the resultant production of a hard, rubbery mass or clump.

As illustrated in the following examples, polyalkylene ether glycols of a molecular weight of from 750 to 6000 appear to be suitable for the preparation of these new rubber-like products. When using the polyethylene ether glycol, which is considered as having the general formula: HO—$(C_2H_4O)_n$—$C_2H_4OH$, the preferred products of the present invention are obtained from those having a molecular weight of from 4000 to 6000. When using the polypropylene ether glycol which is considered as having the general formula: HO—$(C_3H_6O)_n$—$C_3H_6OH$, the preferred compounds of the present invention are made from those having a molecular weight of from 750 to 1200. To produce the rubbery, plastic-like products of this invention in which the polyethylene ether glycol is employed, the amount of the arylene diisocyanate employed will vary depending upon the particular diisocyanate, but it has been found that in general, to produce rubber-like materials of this invention the weight ratio of the diisocyanate to the polyethylene ether glycol will be between 0.25:1 and 0.33:1 provided the molar ratio is between 7.5:1 and 12.0:1. When using the polypropylene ether glycol, the preferred products of this invention are prepared using a weight ratio of diisocyanate to the polypropylene ether glycol of from 0.5:1 and 1:1 provided the molar ratio is between 1.5:1 and 4.5:1.

Any of a wide variety of the arylene diisocyanates may be employed in place of those specifically used to illustrate the invention in the following examples, the common examples of this class being: 2,4-tolylene diisocyanate; meta-phenylene diisocyanate; 4-chloro-1,3-phenylene diisocyanate; methylene-bis-(4-phenyl isocyanate); and 1,5-naphthylene diisocyanate. Although not critical to the operability of this reaction, it is often helpful in preparing uniform blown elastomeric sponges to thin the glycol-isocyanate reaction mixture with a small amount of a selected solvent such as acetone or dioxane to permit uniform distribution of the intermediate in the water added subsequently. This solvent must be miscible with the intermediate and with the water and should not be reactive toward the isocyanate groups in the intermediate.

The following examples are given to illustrate the invention. The parts used are by weight.

*Example 1*

To 120 parts of polyethylene ether glycol of approximately molecular weight 4000 at approximately 70° C., are added slowly with agitation 40 parts of 2,4-tolylene diisocyanate. The reaction mass is stirred at 70° C. for 4 hours. A red-brown, sticky, viscous liquid is obtained. When cooled to room temperature this intermediate is a pale yellow-brown wax.

When 50 parts of this intermediate are dissolved in 150 parts of water at about 35° C., within 1 minute foaming and frothing of the solution occurs, leading rapidly to the formation of a spongy mass.

*Example 2*

Example 1 is repeated, with the reaction to form the intermediate carried out under a dry nitrogen blanket to maintain anhydrous conditions. This intermediate is stored in a desiccator prior to reaction with water to give a pale, yellow-brown sponge as described in Example 1.

Repeating this example and using m-phenylene diisocyanate or methylene-bis-(4-phenyl isocyanate) instead of 2,4-tolylene diisocyanate, produces blown elastomeric sponges having similar properties.

Likewise, similar sponges are produced by substituting polyethylene ether glycol of molecular weight 6000 or polypropylene ether glycol of molecular weight 750 or 1200 for the polyethylene ether glycol of molecular weight 4000.

*Example 3*

To 50 parts of the intermediate of Example 2 is added sufficient acetone to form a viscous solution. To this solution is added 150 parts of water at 25° C. Frothing of the milky suspension occurs almost immediately and a cream-colored, resilient, tough sponge is obtained. This sponge is more uniform than that of Examples 1 and 2.

*Example 4*

Following the procedure of Example 2, 300 parts of the same polyethylene ether glycol reacts with 150 parts of the same diisocyanate for 2 hours at 70° C. After cooling to room temperature in a desiccator this material changes to a very viscous, semi-solid.

To 25 parts of the intermediate of this example is added enough acetone to form a viscous solution when warmed on a steam bath. This solution is removed from the bath and 75 parts of water at 25° C. is added, and the milky suspension is stirred vigorously. Foaming occurs promptly to produce a resilient, white-cream-colored elastomeric sponge which is more uniform in texture than the products of Examples 1 and 2, but less resilient and rubbery than the sponge of Example 3.

*Example 5*

To 30 parts of the intermediate of Example 2 is added sufficient acetone to make a viscous solution. To this solution is added 45 parts of water at room temperature. A sponge is promptly formed. This sponge when dried in vacuo at room temperature does not retain its original shape as well as the sponge of Example 3 dried in a similar manner.

*Example 6*

Following the procedure of Example 3, a sponge is prepared in a spherical flask to produce a resilient rubbery sphere.

As illustrated in the above examples, where the cold or cool water maintained at approximately 0° to approximately 40° C. is added to the polymerization mass, the rate of the reaction by which cross links are formed and the carbon dioxide is involved is controlled so that the carbon dioxide in this case is trapped inside of the elastomer, forming the closed cell sponge structure.

It has been found on testing the reaction mass as the water is added that it is slightly acid so that the evolution of the carbon dioxide takes place in a very dilute acidic aqueous solution. In carrying out the process above described and illustrated in the examples, the amount of water used can be varied, for it has been found that from 100 parts of water per 100 parts of reaction mass, to 600 parts of water per 100 parts of reaction mass, results in a product having the sponge-like properties as distinguished from the mass or clump formation produced in copending application Serial No. 237,660, now abandoned.

This invention provides the manufacture of tough, elastomeric sponges which have many uses. They may be cast in molds of any desired shape to give sheets, rods, tubes, spheres or other shaped articles, or articles of the desired shape may be cut from the blocks of sponge already formed.

The elastomeric articles of this invention maintain resilience at very low temperatures, such as $-20°$ C. In fact, at temperatures as low as $-70°$ C. these products still exhibit some degree of resilience and can be flexed or bounced without breaking.

The firmness of these sponges, combined with their toughness, makes them useful for shock absorption in a wide variety of applications, and, because the cells are not communicating, these sponges afford greater insulation than the open cell type.

I claim:

1. An elastomeric sponge material obtained by reacting from 100 to 600 parts by weight of water with 100 parts by weight of the reaction product of a polyalkylene ether glycol having a molecular weight of from 750 to 6000 and a molar excess of an arylene diisocyanate.

2. An elastomeric sponge material obtained by reacting from 100 to 600 parts by weight of water with 100 parts by weight of the reaction product of a polyethylene ether glycol having a molecular weight of about 4000 to 6000 and a molar excess of an arylene diisocyanate of the benzene series.

3. An elastomeric sponge material obtained by reacting from 100 to 600 parts by weight of water with 100 parts by weight of the reaction product of a polypropylene ether glycol having a molecular weight of from 750 to 1200 and a molar excess of an arylene diisocyanate of the benzene series.

4. An elastomeric sponge material obtained by reacting approximately 300 parts by weight of water with 100 parts by weight of the reaction product of a polyethylene ether glycol having a molecular weight of about 4000 and 2,4-tolylene diisocyanate.

References Cited in the file of this patent

UNITED STATES PATENTS

| Number | Name | Date |
|---|---|---|
| 2,284,896 | Hanford et al. | June 2, 1942 |
| 2,531,392 | Breslow | Nov. 28, 1950 |
| 2,577,279 | Simon et al. | Dec. 4, 1951 |
| 2,597,025 | Orth | May 20, 1952 |
| 2,602,783 | Simon et al. | July 8, 1952 |
| 2,621,166 | Schmidt et al. | Dec. 9, 1952 |

OTHER REFERENCES

DeBell et al.: "German Plastics Practice," pages 463–4 (1946).